United States Patent
Jaroch et al.

(10) Patent No.: US 9,935,817 B2
(45) Date of Patent: *Apr. 3, 2018

(54) MANAGED EXECUTION AND EXPIRATION OF AGENT COMMANDS

(71) Applicant: Webroot Inc., Broomfield, CO (US)

(72) Inventors: Joseph Jaroch, Deer Park, IL (US); Melvyn Morris, Derby (GB)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,104

(22) Filed: Aug. 8, 2016

(65) Prior Publication Data
US 2017/0033973 A1    Feb. 2, 2017

Related U.S. Application Data

(63) Continuation of application No. 13/738,815, filed on Jan. 10, 2013, now Pat. No. 9,413,596.

(51) Int. Cl.
| | | |
|---|---|---|
| *G06F 15/173* | (2006.01) | |
| *H04L 12/24* | (2006.01) | |
| *G06F 9/48* | (2006.01) | |
| *H04L 29/08* | (2006.01) | |

(52) U.S. Cl.
CPC .......... *H04L 41/046* (2013.01); *G06F 9/4843* (2013.01); *H04L 67/10* (2013.01)

(58) Field of Classification Search
CPC ...... G06F 9/4843; H04L 41/046; H04L 67/10
See application file for complete search history.

(56) References Cited

U.S. PATENT DOCUMENTS

| | | | |
|---|---|---|---|
| 6,397,359 B1 * | 5/2002 | Chandra | H04L 41/5009 709/224 |
| 7,721,303 B2 * | 5/2010 | Alves de Moura | G06F 8/38 709/202 |
| 9,413,596 B2 | 8/2016 | Jaroch et al. | |
| 2001/0021929 A1 * | 9/2001 | Lin | G06F 17/30386 |
| 2003/0204547 A1 * | 10/2003 | Davis | G06F 9/4881 718/101 |
| 2005/0044281 A1 * | 2/2005 | McCarthy | G06F 13/372 710/5 |
| 2006/0168173 A1 | 7/2006 | Clemm | |

(Continued)

FOREIGN PATENT DOCUMENTS

WO    2010051837    5/2010

OTHER PUBLICATIONS

European Extended Search Report in Application 14150462.1, dated Jul. 31, 2014, 7 pages.

(Continued)

*Primary Examiner* — Mohamed A Wasel

(57) ABSTRACT

Methods and apparatus for managing the expiration and execution of commands sent from a remote system having administration functions to an agent residing on a computer system are disclosed. An exemplary method includes receiving, at an agent, one or more commands, storing the one or more received commands, retrieving the one or more stored commands, and determining whether the one or more retrieved commands can be executed by comparing at least one time parameter associated with the agent to at least one time parameter associated with the one or more retrieved commands.

20 Claims, 6 Drawing Sheets

(56) References Cited

U.S. PATENT DOCUMENTS

| | | |
|---|---|---|
| 2007/0165654 A1* | 7/2007 | Chai ................. H04L 41/00 370/401 |
| 2007/0174444 A1 | 7/2007 | Kim et al. |
| 2007/0174445 A1 | 7/2007 | Kim |
| 2007/0174447 A1 | 7/2007 | Kim et al. |
| 2007/0174462 A1 | 7/2007 | Kim et al. |
| 2007/0192158 A1 | 8/2007 | Kim |
| 2008/0148219 A1* | 6/2008 | Ousterhout ............ G06F 8/71 717/101 |
| 2008/0168127 A1 | 7/2008 | Hernandez |
| 2009/0172676 A1 | 7/2009 | Jiang et al. |
| 2009/0190726 A1 | 7/2009 | Yahyaoui |
| 2009/0288095 A1 | 11/2009 | Donadeo |
| 2010/0070614 A1 | 3/2010 | Keum et al. |
| 2010/0281294 A1* | 11/2010 | Soulet ................. H04L 41/042 714/2 |
| 2012/0023080 A1 | 1/2012 | Bolohan et al. |
| 2012/0151553 A1 | 6/2012 | Burgess et al. |
| 2012/0311177 A1 | 12/2012 | Visharam et al. |

OTHER PUBLICATIONS

PCT International Preliminary Report on Patentability in PCT/US2014/010701, dated Jul. 14, 2015, 5 pages.

PCT International Search Report in PCT/US2014/010701, dated Jun. 3, 2014, 13 pages.

U.S. Appl. No. 13/738,815, 312 Amendment and Response filed Jun. 28, 2016, 8 pages.

U.S. Appl. No. 13/738,815, Amendment and Response filed Aug. 12, 2015, 13 pages.

U.S. Appl. No. 13/738,815, Amendment and Response filed Jan. 20, 2016, 10 pages.

U.S. Appl. No. 13/738,815, Notice of Allowance dated Mar. 28, 2016, 7 pages.

U.S. Appl. No. 13/738,815, Notice of Allowance dated Jul. 6, 2016, 5 pages.

U.S. Appl. No. 13/738,815, Office Action dated Feb. 12, 2015, 6 pages.

U.S. Appl. No. 13/738,815, Office Action dated Oct. 20, 2015, 9 pages.

* cited by examiner

MANAGED EXECUTION AND EXPIRATION OF AGENT COMMANDS

CROSS-REFERENCE TO RELATED APPLICATIONS

This application is a continuation of U.S. patent application Ser. No. 13/738,815 (now U.S. Pat. No. 9,413,596), filed on Jan. 10, 2013 and entitled "Managed Execution and Expiration of Agent Commands" the disclosure of which is hereby incorporated by reference herein in its entirety.

FIELD OF THE INVENTION

The present invention relates generally to managing the execution and expiration of commands sent to an agent from a remote administration system.

BACKGROUND

Recently, so-called "cloud" based technologies have been developed to offer services, products, and applications residing in networked environments to distributed users located in various locations. These cloud based techniques offer services, products, and applications that are stored and managed in the cloud, i.e. in a central server to which the remote computers are connected, to a variety of users. Thus, a remote computer can access these services, products, and applications from locations around the globe and need not reside within close proximity to the physical location of the products. Further, users are not burdened with direct expenses of maintaining and operating hardware associated with these cloud based products. Instead, most costs associated with hardware and software can be moved from the remote computer to the central server.

SUMMARY

However, current cloud based techniques fall short in that they do not perform a management function nor administration function pertaining to computer systems used by distributed users. That is, there has been no way to send a command from the cloud to a remote computer and later execute the stored command at a scheduled time. Additionally, current systems lack an ability to manage the execution and expiration of these received commands at a remote or distributed computer system.

According to an aspect of the present invention, there is provided a method of evaluating one or more commands to be executed that includes receiving, at an agent, one or more commands, storing the one or more commands, retrieving the one or more stored commands, and determining whether the one or more stored commands can be executed by comparing at least one time parameter associated with the agent to at least one time parameter associated with the retrieved one or more commands.

According to another aspect of the present invention, there is provided a non-transitory, computer-readable medium storage medium, encoded with processor readable instruction to perform a method of evaluating one or more commands to be executed that includes receiving, at an agent, one or more commands, storing the one or more commands, retrieving the one or more stored commands, and determining whether the one or more stored commands can be executed by comparing at least one time parameter associated with the agent to at least one time parameter associated with the retrieved one or more commands.

According to yet another aspect of the present invention, there is provided an apparatus for evaluating one or more commands to be executed, the apparatus including a computer-based system having an agent installed thereon, the agent arranged to receive one or more commands from a remote system, store the one or more commands received from the remote system, and execute the one or more commands received from the remote system; the agent further arranged to determine whether the one or more commands received from the remote system can be executed by comparing at least one time parameter associated with the agent to at least one time parameter associated with the one or more commands received from the remote system.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

As will become apparent in view of the following disclosure, the various aspects and embodiments of the invention can be combined.

DETAILED DESCRIPTION

Figure 1:
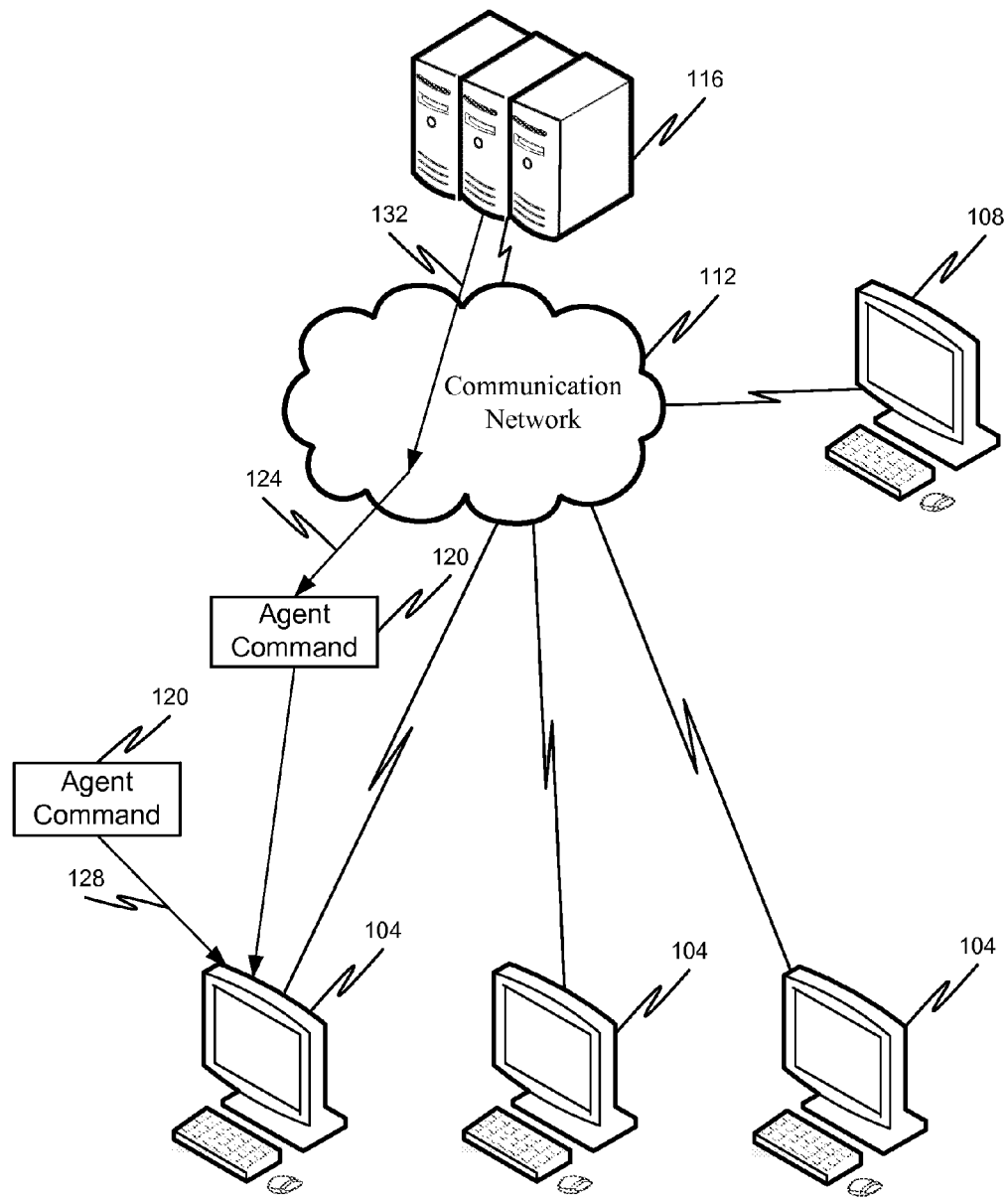
FIG. 1 depicts a first communication system configuration in accordance with embodiments of the present invention.

Referring to FIG. 1, a computer network is generally shown as being based around a distributed network such as a communication network 112. Communication network 112 may comprise any type of known communication medium or collection of communication media and may use any type of protocols to transport messages between endpoints. The communication network 112 may include wired and/or wireless communication technologies. The Internet is an example of the communication network 112 that constitutes an Internet Protocol (IP) network consisting of many computers, computing networks, and other communication devices located all over the world, which are connected through many telephone systems and other means. Other examples of the communication network 112 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 112 need not be limited to any one network type, and instead may be comprised of a number of different networks and/or network types.

Plural local or "computer" systems 104, 108 are connected via the communication network 112 to a "central" or "remote administration" system 116. The computer system 104, 108 may each be variously a personal computer, a server of any type, a PDA, mobile phone, an interactive television, or any other device capable of loading and operating computer objects. Computer system 104, 108 may also be considered a remote computer system; such a remote computer system is generally within a distributed network environment where one or more computer systems 104, 108 relies on a service, product, or application that resides in a network environment that is not local to the computer system 104, 108. As a remote computer system, computer system 104, 108 might access services, products, or applications via communication network 112. Computer system 104 generally refers to an administered computer system. Computer system 108 generally refers to an administrator computer system.

An agent command 120, as depicted, may comprise a single command or collection of commands. A command may be any character, collection of characters, word, or collection of words that a program, such as an agent, understands and can execute. As one example, a command may include one or more commands that reboots computer system 104 or cause computer system 104 to reboot. As another example, a command may be one or more commands that replaces, updates, deletes, copies, saves, or creates a registry entry in a registry associated with one or more computer systems 104. Additional examples of a command may include, but are not limited to: one or more commands that copy files from one location to another or sends a file from one location to another; one or more commands that cause another file, process or the like to be executed; one or more commands that create, modify, remove, or delete a file; one or more commands that updates, modifies, creates, or removes a system setting; one or more commands that initiate the execution of a file, program, or the like, wherein the program, file, or the like may or may not be located on a computer system 104; one or more commands that initiate or run a system cleanup or cause a system cleanup to run; one or more commands that retrieves a status of a particular item, setting, or object; and one or more commands that downloads another command or causes another command to be downloaded via a communication network 112.

Figure 3:
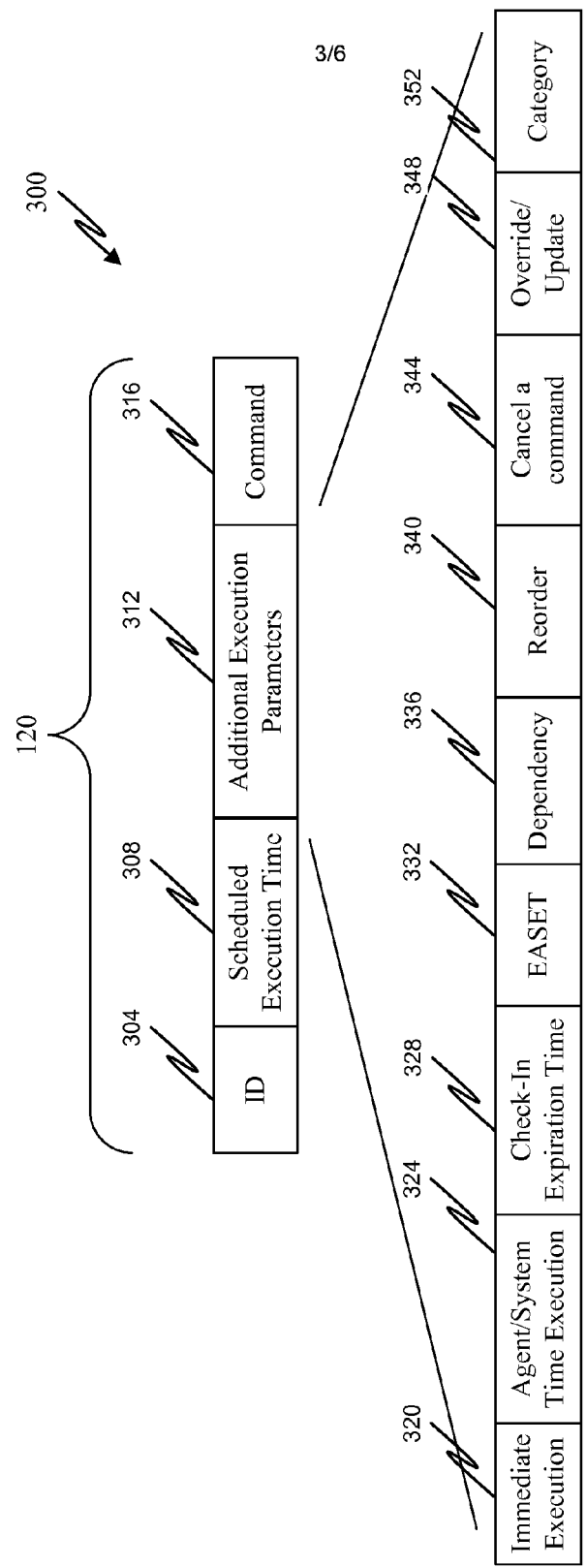
FIG. 3 shows a more detailed view of an agent command data structure in accordance with embodiments of the present invention.

Agent command 120 may comprise a data structure, such as the one shown in FIG. 3, wherein agent command 120 includes an ID, scheduled execution time, additional execution parameters, and one or more commands as previously described above. An agent command 120 is shown in FIG. 1 and may for example be downloaded to a computer system 104 via the communication network 112 as shown by lines 124 or applied directly as shown by line 128. Agent command 120 may originate from the remote administration system 116. An agent command 120 may reside in computer RAM, on the hard disk drive of the computer, on removable storage connected to the computer, such as a USB pen drive, an email attachment, etc.

Figure 2:
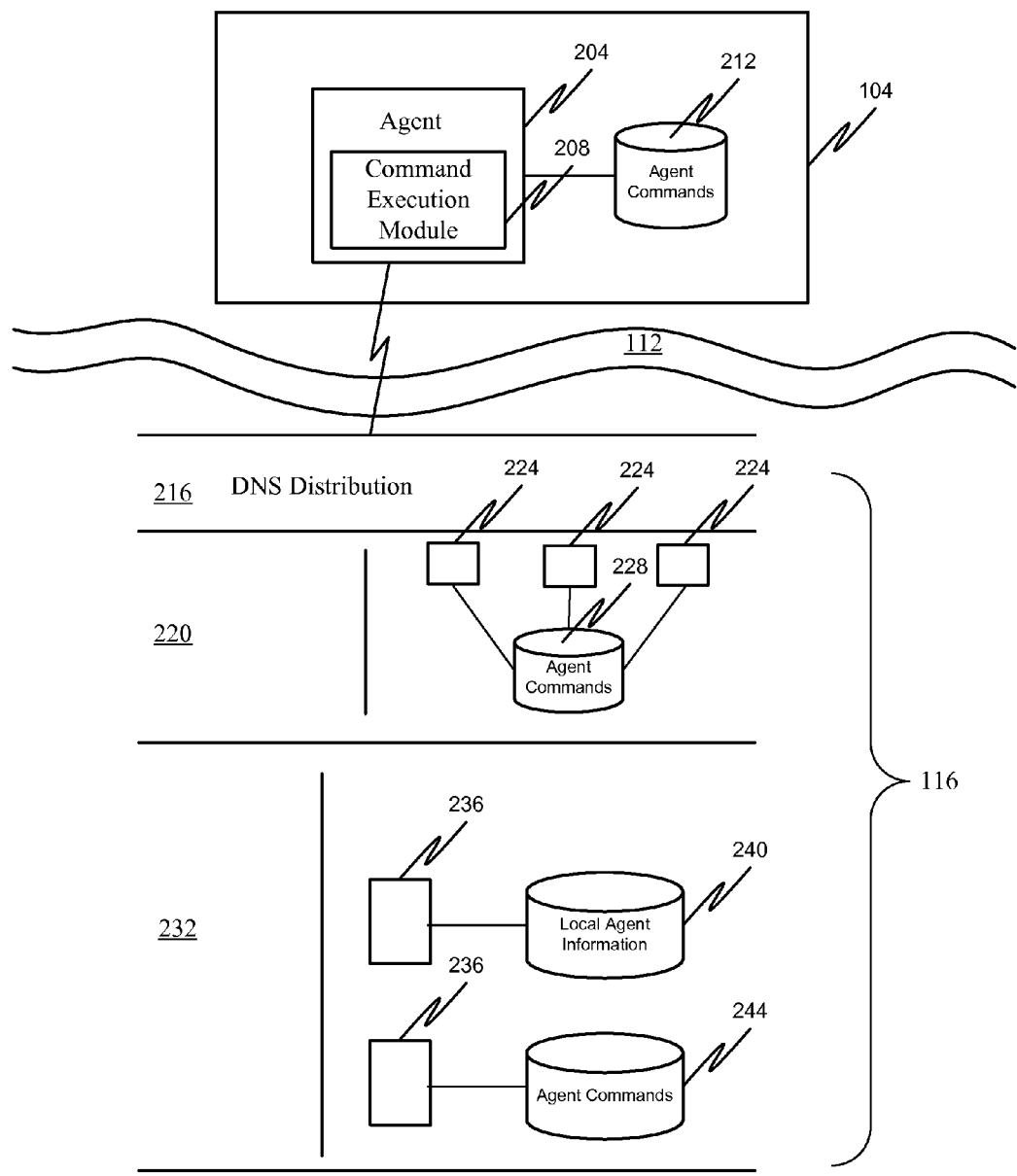
FIG. 2 illustrates a more detailed view of an example of a remote system 104 and a remote system administration system 116 in accordance with embodiments of the present invention.

FIG. 2 depicts an example of an arrangement for a remote administration system 116 and a computer system 104 in accordance some embodiments of the present disclosure. The computer system 104 has a local agent 204, also known as a program or software, running on the computer system 104. The local agent 204 may include one or more modules for accomplishing certain tasks or methods. For example, the local agent 204 includes an agent command and execution module 208 responsible for executing one or more agent commands 120 received from one or more remote administration systems 116. Although the local agent 204 is illustrated as including agent command and execution module 208, additional modules may be included and function within or in conjunction with the local agent 204.

Non-limiting examples of additional modules may include: an anti-malware scanning module; an anti-malware update module; a configurable firewall module; and a communication module. The term "malware" is used herein to refer generally to any executable computer file or, more generally "object", that is or contains malicious code, and thus includes viruses, Trojans, worms, spyware, adware, etc. and the like. For example, the agent command and execution module 208 may work in a coordinated manner with an anti-malware scanning module and an anti-malware update module by causing certain commands or functions, received from the remote administration system 116, to execute and thereby achieve an intended result. Such an intended result, for example, may include a forced update of anti-virus definitions and/or the asynchronous execution of an anti-malware scan.

The local agent 204 may be developed in a low-level language, having direct access to system resources such as the video display, disk, memory, the network(s), and without the incorporation of many standard code or dynamic linked libraries to perform these functions. Memory usage is optimised by storing data in the local database structure 212. All unnecessary dynamic link libraries are unloaded from the process immediately as they are identified as no longer being used, and background threads are merged to reduce CPU usage. A small, efficient local agent 204 can be deployed more quickly and can be used alongside other programs, including other security programs, with less load on or impact on the computer's performance. This approach also has the advantage of having less surface area for attack by malware making it inherently more secure.

The local agent 204 communicates with the remote administration system 116 over the communication network 112 via, for example, the Internet's Domain Name Resolution System (DNS) 216. As the local agent 204 receives directed commands from the remote administration system 116, the local agent 204 may be responsible for informing the remote administration system 116 of its current status; this is also known as performing a "check-in" or "checking-in" with the remote administration system 116. Upon checking-in, the local agent 204 is in communication with the remote administration system 116 and may communicate status information to the remote administration system 116. Status information may include, but is not limited to, information identifying the local agent 204, information identifying the computer system 104, an IP address associated with computer system 104, current operational status and/or activity of the local agent 204, and a result of an agent command 120 execution, if any. Such status information may be provided to the remote administration system 116. Upon receiving such status information, the remote administration system 116 logs the information included in the check-in and creates a timestamp identifying the time when the local agent 204 communicated with the remote administration system 116. Such status information and check-in timestamps may eventually be stored in a local agent information database 232. Additionally, during the check-in, computer system 104 may receive an agent command 120 from remote administration system 116. Such command may be processed as described with respect to FIG. 5, as discussed later.

Check-ins may occur asynchronously or according to a predetermined schedule. For example, a local agent 204 may randomly check-in throughout the day when connected to a communication network 112, such as the internet. Alternatively, or in addition, a local agent 204 may check-in every 5 minutes when connected to a communication network 112, such as the internet. As another example, local agent 204 may check-in at a predetermined time, for example, every day at 1:00 PM. Further, the local agent 204 may check-in following a significant system event, such as a computer system 104 reboot. The schedule and frequency of the check-in can be configured according to a frequency of check-in parameter or setting. Regardless of when the check-in occurs, the time of check-in is recorded at remote administration system 116 and at the agent command and execution module 208.

The remote administration system 116 may include a first layer comprising one or more servers 224, which in this example are web servers. However, it will be appreciated that any type of suitable server may be used according to the need. The computer systems 104 may be allocated to one or more of the web servers 224.

The first layer 220 may communicate with local agent 204 in real-time, receiving and logging status information when local agent 204 checks-in and further logging or recording an associated timestamp. Each web server 224 of the first layer 220 is connected to a database 228 which contains entries for all of the local agents 204 known to the remote administration system 116. In one example, database 228 contains entries of all local agents 204 within a particular environment or for a particular organization. Alternatively, or in addition, database 228 may contain entries of all local agents 204 within many differing environments or for many differing organizations.

Sitting behind the first layer 220 is a second layer 232. Information about local agents 204 that is received by the first layer 220 from the computer system 104 is sent to the second layer 232 such that a master record is maintained at the second layer 232. The master record may contain all check-in related information received from all computer systems 104 and all agent commands 120 sent to all computer systems 104. The second layer 232 has one or more servers 236 (referred to as "central servers" in this disclosure) connected to one or more "master" databases which store all of the information received from all web servers 224 from all computer systems 104. The databases may comprise a local agent information database 240 for storing information related to local agents 204, such as status and timestamp information received when a local agent 204 checks-in. The databases may further comprise an agent commands database 244 for storing all local agent commands 120 sent to all local agents 204.

In an exemplary embodiment, some or all of the servers 224, 236 and databases 228, 240, and 244 of the first and second layers 220, 232 are implemented using cloud computing. Cloud computing is a means of providing location-independent computing, whereby shared servers provide resources, software, and data to computers and other devices on demand. Generally, cloud computing customers do not own the physical infrastructure, instead avoiding capital expenditure by renting usage from a third-party provider. Cloud computing users avoid capital expenditure on hardware, software, and services when they pay a provider only for what they use. New resources can quickly be put on line. This provides a large degree of flexibility for the user.

An example of cloud computing is the Amazon Elastic Compute Cloud (EC2), which is a central part of the Amazon.com cloud computing platform, Amazon Web Services (AWS). Another example is the Windows Azure Platform, which is a Microsoft cloud platform that enables customers to deploy applications and data into the cloud. EC2 is used in the present example to provide cloud computing. Nonetheless, it will be appreciated that, in principle, any suitable cloud architecture could be used to implement the remote administration system 116. Alternatively, conventional data centres could be used to implement the remote administration system 116, or a mixture of conventional data centres and cloud-based architecture could be used.

In operation, an administrator may wish to send one or more agent commands 120 to a computer system 104; the agent command 120 may be received via the local agent 204 running on the computer system 104. An administrator may communicate with the remote administration system 116 via any computer system, such as computer system 108, to issue such a command. For example, an administrator may log into the remote administration system 116, via a web browser on computer system 108, to access administration-related information. Administration-related information may comprise any information relating to administering hardware, software, or the like for computer systems 104 or for the environments in which computer systems 104 reside. Once connected to the remote administration system 116, an administrator may select a specific computer system 104, or multiple computer systems 104 in which to have an agent command 120 issued. Each computer system 104 available via remote administration system 116 may be uniquely identified using a unique computer system identification, such as a unique computer system name, number, or the like. Computer systems 104 may be arranged, or grouped, according to specific operating parameters, operational environments, company, departments, operating system, organizational units etc. Although the above example pertained to selecting an agent command 120 and issuing the agent command 120 to a computer system 104 using a web browser, other methods of accessing such data and issuing agent commands are contemplated. For example, instead of a web browser, an administrator may interact directly with a program running on remote administration system 116.

If, for example, an administrator wishes to send an agent command 120 to cause one or more of the computer systems 104 to reboot, the administrator would simply select the computer system 104 from a list, select or enter the reboot command to be sent, select or enter a scheduled execution time of the command, and issue the command. The newly issued command may reside in a queued list located at database 228. Additionally, as previously discussed, the issued command may also be recorded in a master record, such as in agent commands database 244.

Upon the next occurrence of a local agent 204 check-in, the new command would be communicated to local agent 204. The agent command and execution module 208 may then process the newly received command according to whether the new command is to be executed immediately, or is to be placed in an agent command queue and executed according to a scheduled execution time.

Turning now to FIG. 3, an example agent command data structure 300 is depicted in accordance with some embodiments of the present disclosure. An agent command 120 may comprise one or more data structures containing one or more parameters related to the identification, operation, and processing of an agent command 120. For example, an agent command 120 may include a command ID parameter 304, scheduled execution time parameter 308, and the actual command 316 to be executed. The command ID parameter 304 may be any identification information used to uniquely identify a specific agent command 120. For example, the command ID 304 may be based on one or more incrementing counters that provide a unique command ID 304 every time an agent command 120 is to be issued by the remote administration system 116.

The scheduled execution time parameter 308 is generally the time at which a specified command, for example command 316, is to be executed. The scheduled execution time parameter 308 may be specified as the actual time in which a command 316 is to execute, for example in mm:dd:yyyy:ss:ms format, or may correspond to a number of seconds or milliseconds that have passed. For example, scheduled execution time parameter 308 may have a value of 32,313,600 seconds and may execute after this amount of seconds have passed since a known starting time, for example Jan. 1, 2000, at 00:00 (00:00:0000:00:00). Alternatively, or in addition, the scheduled execution time parameter 308 may correspond to a duration of time, for example five minutes. In such an example, the command 316, or agent command 120, would be executed five minutes after being received by local agent 204. Alternatively, or in addition, the scheduled execution time parameter 308 may correspond to a duration window in which an agent command may execute. In such an instance, the command 316, or the agent command 120 might execute between 01:09:0013:03:00:00 and 01:09:0013:04:00:00.

Command field 316 contains the necessary character, characters, word, or words that corresponds to the actual command or commands to be executed as previously discussed. For example, command field 316 may contain the necessary instructions to cause computer system 104 to reboot.

In addition to the ID parameter 304, the scheduled execution parameter 308, and the command field 316, agent command 120 may include other parameters or rule sets 312 that alter the scheduling, order, and execution of command 316 and/or agent command 120. For example, agent command 120 may include an immediate execution parameter 320 which specifies whether or not the command 316 is to be immediately executed upon receipt by local agent 204.

Agent command 120 may also include an agent/system time execution parameter 324. The agent/system time execution parameter 324 may indicate whether the agent command 120 is to execute at a scheduled time according to the time of the computer system 104 or according to the time of the remote administration system 324. In some instances, where a difference in time exists, for example, between the time at the computer system 120 on which agent 204 is installed and the time at the remote administration system 116, it may be beneficial to have an agent command 120 execute according to one or the other. For example, processing and bandwidth resources may be available, or the cost to operate the processing resources may be reduced, at a certain time at the remote administration system 116. In such instances, it would be beneficial to ensure that if an agent command 120 and/or command 316 was scheduled to execute at a specified or scheduled time, that the execution occur according to the time of the remote administration system 116. In other instances, resources may be available or a computer system 104 may be available at a certain location in which the computer system 104 resides. In this instance, it may be beneficial to ensure that if an agent command 120 and/or command 316 was scheduled to execute at a specified or scheduled time, that the execution occur according to the time of the computer system 104. Alternatively, or in addition, the agent/system time execution parameter 324 may be used to indicate whether the agent command and execution module 208 should modify the time of the computer system 104 to match that of the remote administration system 116.

Agent command 120 may also include a check-in expiration time parameter 328. The check-in expiration time parameter 328 may indicate whether agent command 120 is to execute command 316 based on whether or not the local agent 204 has checked-in to remote administration system 116 within a specified period of time or by a specified time. Stated another way, check-in expiration time parameter 328 may cause an agent command 120 to become expired if too much time has passed since local agent 204 has last checked-in. For example, in instances where local agent 204 has not checked-in with the remote administration system 116, say for three days, but an agent command 120 is scheduled to execute, the check-in expiration time parameter 328 may have been specified at a period of two days. In such an instance, the check-in expiration time parameter 328 of two days would prevent the agent command 120 from executing.

In another example, several agent commands 120 may be issued and received at a computer system 104. The scheduled execution time parameter 308 indicates that these agent commands 120 are scheduled to execute on Jan. 14, 2013 at 3:00 PM EST and the check-in expiration time parameter 324 is set to two days. On Jan. 13, 2013, after local agent 204 has checked-in with remote administration system 116, computer system 104 is turned off, as the user may be away from computer system 104. If the computer system 104 is turned on on Jan. 17, 2013 for example, the duration of time that has passed since the last check-in with remote administration system 116 is determined to exceed the two day threshold indicated by check-in expiration time parameter 328. Thus, the agent command 120 is cancelled or expired.

In another example, several agent commands 120 may be issued and received at a computer system 104. The scheduled execution time parameter 308 indicates that these agent commands 120 are scheduled to execute on Jan. 14, 2013 at 3:00 PM EST and the check-in expiration time parameter 324 is set to Jan. 14, 2013, 13:00:00 (1:00 PM EST). If prior to executing the agent commands, it is determined that local agent 204 has not checked-in with remote administration system 116 at or after Jan. 14, 2013, 13:00:00, the agent command 120 may be cancelled or will expire.

In the above examples, the check-in expiration time parameter 328 was explicitly specified and included in agent command 120; however, it is also contemplated that a check-in expiration parameter 328 need not be explicitly sent in agent command 120. Alternatively, or in addition, a check-in expiration parameter may comprise a predetermined threshold. In such an instance, a separate check-in expiration time parameter 328 need not be explicitly be sent in agent command 120 unless a check-in expiration time deviates from the default or predetermined threshold.

Agent command 120 may also include an Execute After Scheduled Execution Time (EASET) parameter 332. The EASET parameter 332 indicates whether or not an agent command may be executed after the scheduled execution time has passed. In some instances, it may not be desirable to execute a command after the scheduled execution time has passed. For example, if the computer system 104 was turned off while an agent command 120 was scheduled to execute, upon turning on the computer system 104, the reason or condition prompting the need to execute the agent command 120 may no longer exist. In such an instance, the EASET parameter 332 would indicate that the agent command 120 is not to execute after the scheduled execution time has passed.

In other instances, it may be acceptable to execute a command after the scheduled execution time has passed. For example, if the computer system 104 was turned off while an agent command 120 was scheduled to execute a command 316 that gathered capacity information of a hard drive associated with computer system 104, upon turning on the computer system 104, if the EASET parameter 332 indicated that it is acceptable to execute agent command 120, then agent command 120 will execute and gather such hard drive capacity information.

In the above examples, the EASET parameter 332 was explicitly specified and included in agent command 120; however, it is also contemplated that an EASET parameter 332 need not be explicitly sent in agent command 120. Alternatively, or in addition, agent command and execution module 208 may default to always executing an agent command 120 after the scheduled execution time has passed unless an EASET parameter 332 is explicitly included in agent command 120; in this instance, the EASET parameter 332 need not be sent in agent command 120.

Dependency parameter or rule set 336 may also be included in an agent command 120 as an additional parameter 312. Dependency parameter or rule set 336 may indicate that the execution of an agent command 120 is dependent on the execution of another agent command 120. For example, and in no way limiting, there may be instances where an administrator wishes to have a computer system initiate an anti-malware scan. However, the administrator wishes that the anti-malware scan be initiated after an anti-malware update has been executed. Stated another way, the execution of the anti-malware scan may depend on the execution of the anti-malware update; in such an instance, when issuing an agent command 120, an administrator may have the dependency or rule set parameter 336 reflect this dependency. For example, dependency parameter 336 may include the ID parameter 304 of the command of which it depends upon. In the above example for instance, dependency parameter 336 may include an ID parameter of the anti-malware update. Prior to executing the anti-malware scan agent command, agent command and execution module 208 would verify that the anti-malware update has executed.

Reorder parameter or rule set 340 may also be included in an agent command 120 as an additional parameter 312. Reorder parameter or rule set 340 may be used by an administrator or by the agent command and execution module 208 to explicitly reorder agent commands 120 waiting to be executed. The reorder parameter will be discussed further with respect to FIG. 4B.

Cancel a Command parameter 344 may also be included in an agent command 120 as an additional parameter 312. Cancel a command parameter 344 may be used by an administrator to issue an agent command 120 which cancels, expires, or removes a previously issued agent command. In such an instance, cancel a command parameter 344 may include the ID parameter 304 of the command of which it is to cancel.

Override/Update parameter 348 may also be included in an agent command 120 as an additional parameter 312. Override/Update parameter 348 may be used by an administrator to issue an agent command 120 which updates or overrides a previously issued agent command. In such an instance, Override/Update parameter 348 may include the ID parameter 304 of the command of which it is to update or override.

Category parameter 352 may also be included in an agent command 120 as an additional parameter 312. Category parameter 352 may be used by an administrator to group or identify an agent command 120 according to a category of which the command operates. The categories may be user definable and may be created in real-time. For example, a "system health" category parameter 352 may be included in an agent command 120 where the command 316 pertains to commands causing a disk cleanup to execute, or performing a defragmentation on a hard drive associate with computer system 104. As another example, a "registry mod" category parameter 352 may be included in an agent command 120 where the command 316 pertains to causing a modification to a registry associated with computer system 104.

Although additional execution parameters 312 is illustrated as including immediate execution parameter 320, agent/system time execution parameter 324, check-in expiration time parameter 328, EASET parameter 332, dependency parameter 336, reorder parameter or rule set 340, cancel a command parameter or rule set 344, override/update parameter or rule set 348, and category parameter 352, it is contemplated that not all the above described parameters need to be included. Varying numbers, combinations, and orders of additional parameters may be included in additional execution parameters 312 and hence agent command 120. For example, agent/system time execution parameter 324 and check-in expiration time parameter 328 may be the additional parameters included in agent command 120. In another instance, dependency parameter 336 and override/update parameter or rule set 348 may be included. All combinations and permutations of parameters are contemplated.

Figure 4A:
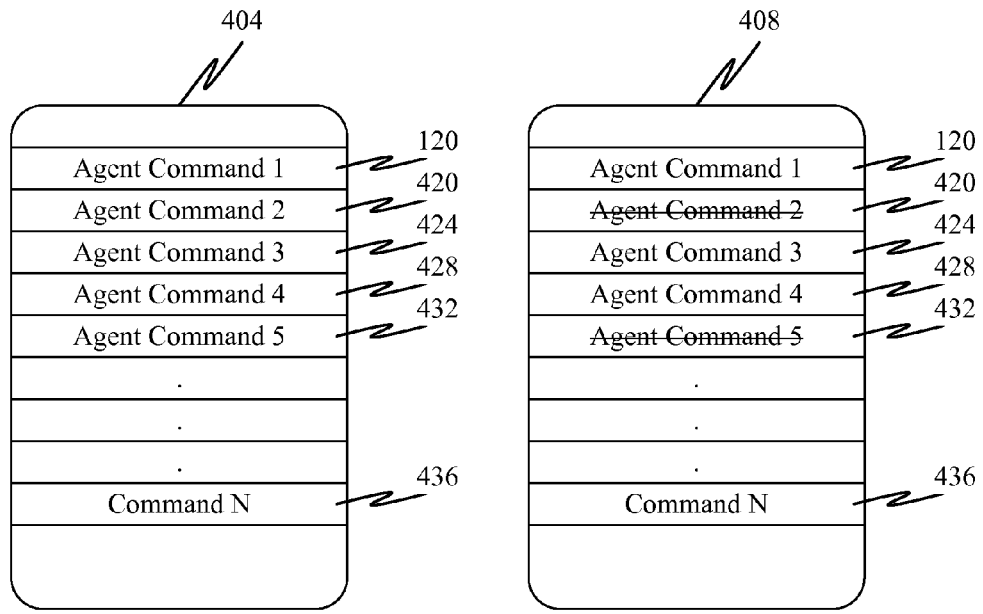
FIG. 4A illustrates a detailed view of an agent command list in accordance with embodiments of the present invention.

Turning now to FIG. 4A, a detailed view of an agent command list in accordance with embodiments of the present invention is illustrated. Agent command list 404 is representative of a list of agent commands 120 that may be found in agent commands database 212, 228, and 244. As previously discussed, when a local agent 204 checks-in with a remote administration system 116, one or more agent commands may be sent by or retrieved from remote administration system 116. If the agent command and execution module 208 determines that a command will be stored for future execution, agent command and execution module 208 places the received agent command in a list, such as database 212. Database 212 may be adapted such that agent commands are stored in a first in first out (FIFO) order, last in first out (LIFO) order. Alternatively, or in addition, agent command and execution module 208 may store agent commands according to a scheduled execution time. Additionally, as the local agent 204 retrieves agent commands, the agent commands may be stored amongst other agent commands already populated in database 212.

As depicted in FIG. 4A, list 404 has been populated with multiple agent commands 120, 420, 424, 428, 432, and 436. Separately, or as part of executing an agent command, agent command and execution module 208 may inspect each agent command currently in the list 404 and determine whether or not the agent command has expired for one reason or another. For example, agent command and execution module 208 may inspect various parameters included with an agent command 120 to determine whether or not the agent command 120 should not be executed. Those agent commands that have expired, are then cancelled, removed, and/or deleted from list 404.

For example, agent command and execution module 208 may inspect the check-in expiration time parameter 328 to determine if an agent command is still valid. The agent command and execution module 208 may first determine an amount of time that has passed since the local agent 204 has last checked-in. The agent command and execution module 208 may then compare the amount of time that has passed to the check-in expiration time parameter 328. If the amount of time that has passed since the local agent 204 last check-in with remote administration system 116 is greater than the threshold indicated by the value of check-in expiration time parameter 328, the agent command and execution module 208 will cancel the agent command or cause the agent command to become expired. If the agent command is cancelled or expired, the agent command will be removed from the agent command list, for example 404. Agent command list 408 illustrates an agent command list after agent command and execution module 208 has performed a check on each agent command to determine if it has expired based on a last check-in time. As can be seen, agent commands 420 and 432 have expired as indicated by the strike-through.

As another example, the agent command and execution module 208 may compare the time of the last check-in by the local agent 204 to the check-in expiration time parameter 328. If the check-in expiration time parameter 328 specifies a date and time that occurs after the time of the last check-in by the local agent 204, the agent command and execution module 208 may cancel the agent command or may cause the agent command to become expired. If the agent command is cancelled or expired, the agent command will be removed from the agent command list, for example 404. Agent command list 408 illustrates an agent command list after agent command and execution module 208 has performed a check on each agent command to determine if it has expired. As can be seen, agent commands 420 and 432 have expired, as indicated by the strike-through.

Alternatively, or in addition, commands 120, 420, 424, 432, and 436 may reside in a queue list located at database 228. If, for example, local agent 204 has not checked-in with remote administration system 116 for a period of time, issued agent commands 120 may accumulate in the queue list located in database 228. Prior to communicating these queued commands to local agent 204, remote administration system 116 may perform a check for expired commands in a similar manner as described with respect to agent command and execution module 208. For example, remote administration system 116 may perform a check for commands that may have expired that are located in database 228; if any commands that have expired are located, those commands may be removed from database 228. Commands may have expired to the same reasoning as described above.

Figure 4B:
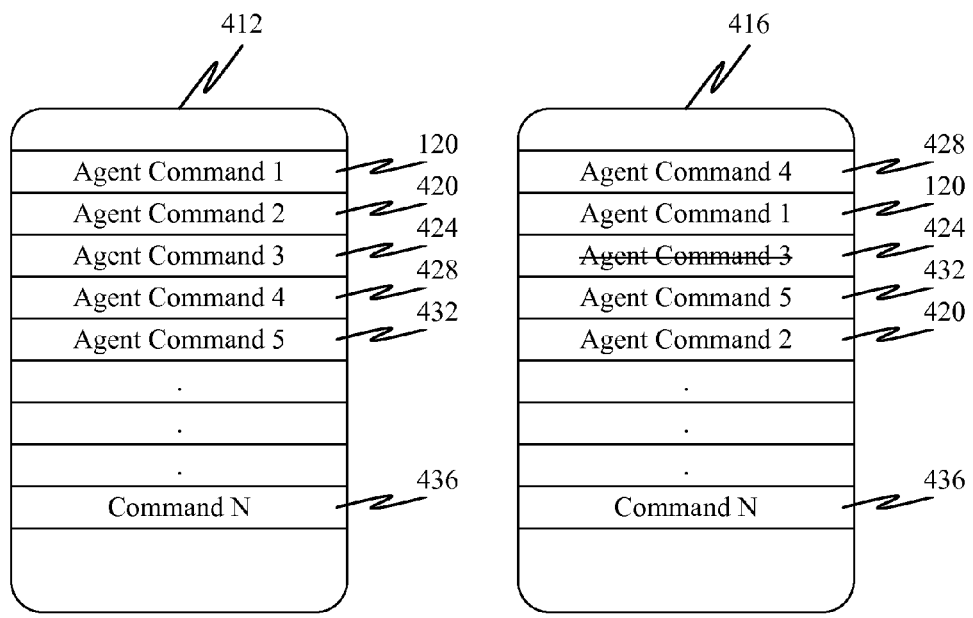
FIG. 4B illustrates a detailed view of an agent command list in accordance with embodiments of the present invention.

Referring now to FIG. 4B, a detailed view of an agent command list in accordance with embodiments of the present invention is illustrated. Agent command list 412 is representative of a list of agent commands similar to that of agent command list 404, except that the agent commands in list 412 are ordered according to the scheduled execution time as indicted by a scheduled execution time parameter 308. Agent command and execution module 208 may inspect each agent command in the agent command list 412, as previously discussed, to determine if each agent command has expired. If an agent command has expired, such as agent command 424, the agent command will be removed from the agent command list, as depicted in agent command list 416 (strikethrough indicates agent command has been removed from the agent command list).

Additionally, depending on a reorder parameter 340, the commands in the agent command list may be reordered. For example, the scheduled execution times may be modified and the agent command list may reflect this modification. If the reorder parameter or rule set indicates that one or more commands may be reordered, for instance their scheduled execution time may be modified, agent command and execution module 208 may modify the scheduled execution time parameter 308 of each agent command according to a predefined rule set and/or according to a rule set defined in the reorder parameter 340 of one or more agent commands For example, agent command 120, 428, 432, and 420 may include a reorder parameter or rule set 340 indicating that the agent commands may be reordered. A rule set may indicate that a command or command category, such as command 316, a command ID parameter 304, or a category parameter 352, may be reordered to achieve a more efficient or more effective manner of operations. For example, agent command 120 may run more efficiently or more effectively after agent command 428 has been executed. In such an instance, and as depicted in agent command list 416, the scheduled execution time parameter 308 of agent command 428 may be modified such that agent command 428 will execute prior to agent command 120. Likewise, agent command 420 may run more efficiently or more effectively after agent command 432 and agent command 424 have been executed. In such an instance, and as depicted in agent command list 416, the scheduled execution time parameter 308 of agent command 420 may be modified such that agent command 420 will execute after agent command 432 and agent command 120.

Alternatively, or in addition, commands 120, 420, 424, 432, and 436 may reside in a queue list located at database 228. If, for example, local agent 204 has not checked-in with remote administration system 116 for a period of time, issued agent commands 120 may accumulate in the queue list located in database 228. Prior to communicating these queued commands to local agent 204, remote administration system 116 may perform a check for expired commands or commands that may be reordered in a similar manner as described with respect to agent command and execution module 208. For example, remote administration system 116 may perform a check for commands are located in database 228 that may have expired or for commands that may be reordered to improve command efficiency or effectiveness; if any commands that have expired are located, those commands may be removed from database 228. Commands may have expired to the same reasoning as described above. If any commands can be reordered to improve command efficiency or effectiveness, those commands identified may be reordered. Commands may need to be reordered for the same reasoning as described above.

Figure 5:
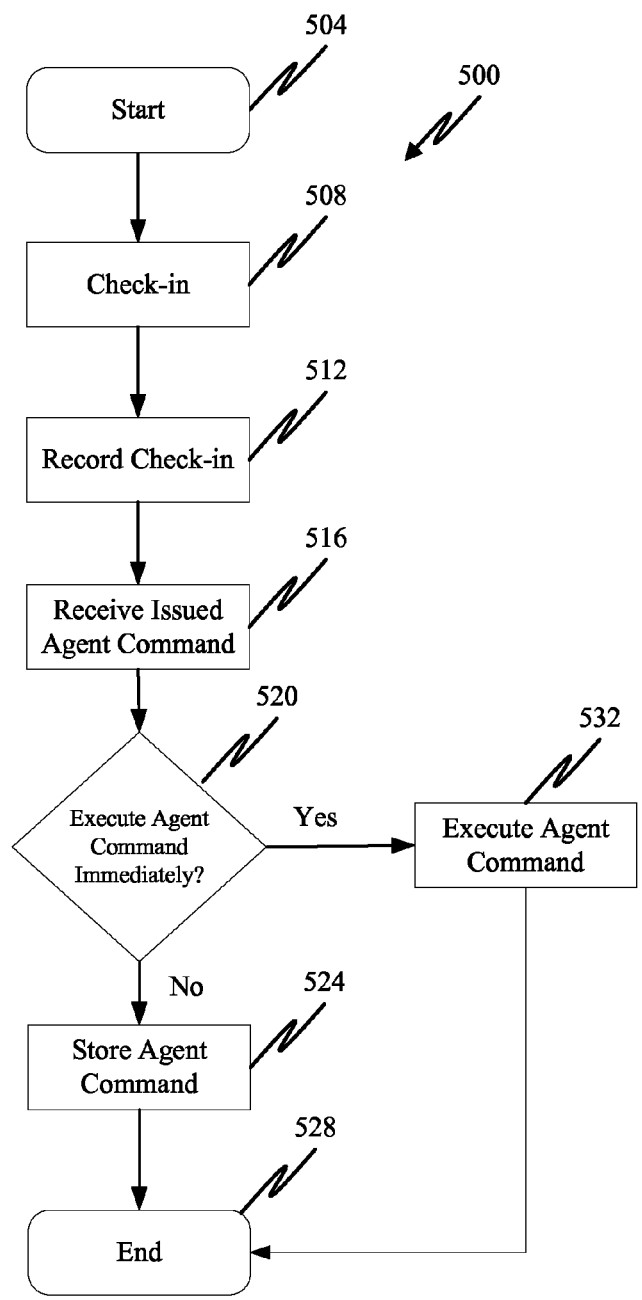
FIG. 5 depicts a flowchart showing the operation of an example of a method in accordance with embodiments of the present invention.

Referring now to FIG. 5, an exemplary flow diagram showing the operation of an example of a method 500 in accordance with at least some embodiments of the present disclosure is depicted. In at least some embodiments, method 500 is performed by a device, such as computer system 104. In at least some embodiments, method 500 is performed by agent command and execution module 208. More specifically, one or more hardware or software components may be involved in performing the method 500. Method 500 can be executed as a set of computer-executable instructions executed by a computer system and encoded or stored on a computer-readable medium. Hereinafter, the method 500 shall be explained with reference to the systems, components, modules, software, data structures, etc. described in conjunction with FIGS. 1-4. More specifically, method 500 shall be explained as if executed by the agent command and execution module 208. However, method 500 may be executed by hardware, software, and modules previously described. For example, it is to be understood that method 500 may be executed entirely by local agent 204.

Method 500 is initiated at step 504. Method 500 may continuously flow in a loop, flow according to a timed event, or flow according to a change in an operating or status parameter. Once method 500 has started, the agent command and execution module 208 checks-in (step 508) with a remote administration system, such as remote administration system 116, to provide a status and/or receive agent commands 120, as previously described. From step 508, flow passes to step 512, where the agent command and execution module 208 records the time of the check-in. Flow then passes to step 516 where the agent command and execution module 208 receives an agent command, such as agent command 120. The agent command and execution module 208 then determines whether or not the received command is to be executed immediately at step 520. For example, if the immediate execution parameter 320 indicates that the received command is to be immediately executed, the agent command and execution module 208 proceeds to execute the command in step 532 and method 500 ends at step 528. If the agent command and execution module 208 determines that the received agent command 120 does not require immediate execution, control passes to step 524 where the agent command and execution module 208 stores the agent command. The agent command and execution module 208 may store the agent command in an agent command data base or list 212. Method 500 then ends at step 528.

Figure 6:
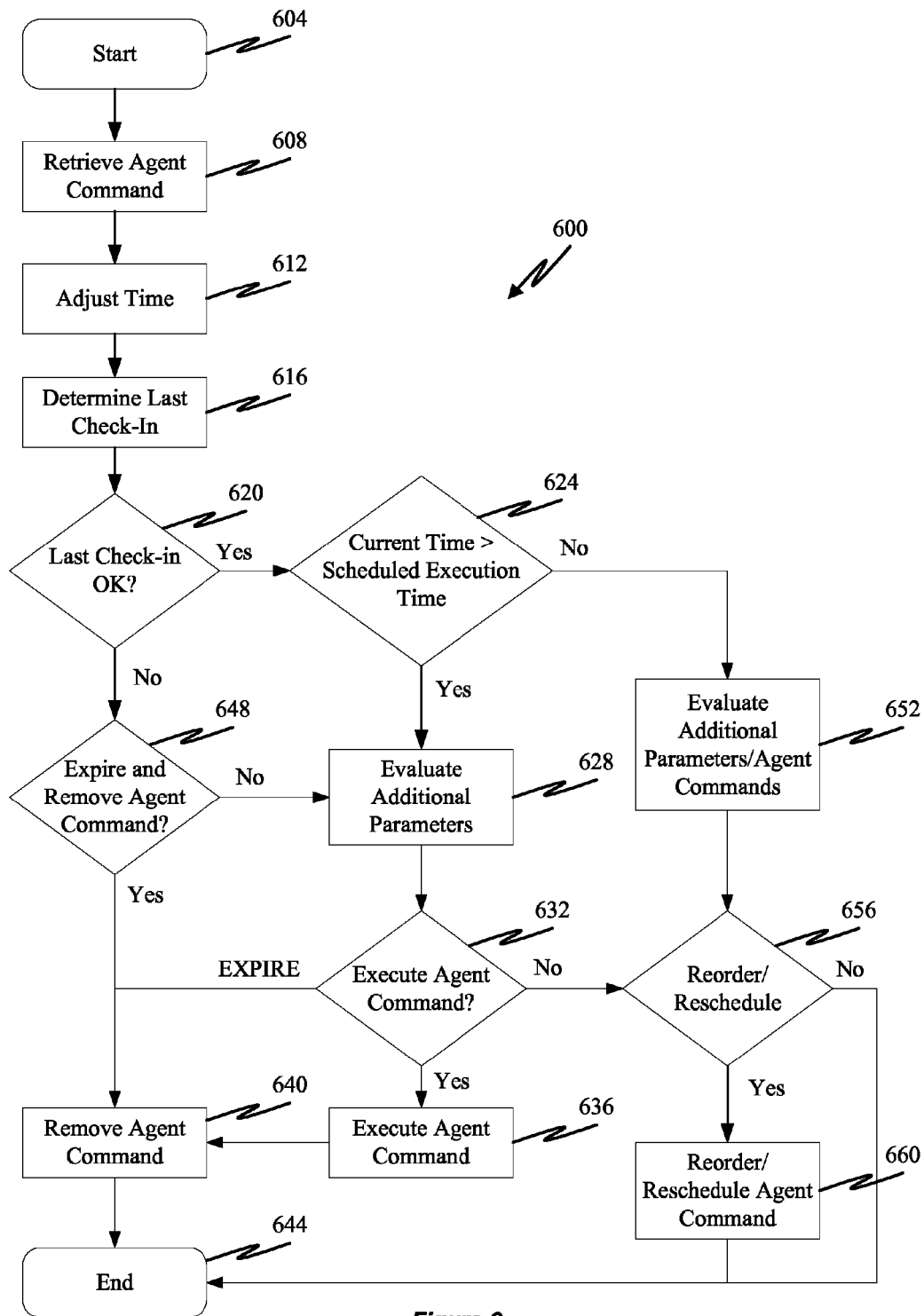
FIG. 6 depicts a flowchart showing the operation of an example method in accordance with embodiments of the present invention.

Referring now to FIG. 6, an exemplary flow diagram showing the operation of an example of a method 600 in accordance with at least some embodiments of the present disclosure is depicted. In at least some embodiments, method 600 is performed by a device, such as computer system 104. In at least some embodiments, method 600 is performed by agent command and execution module 208. More specifically, one or more hardware or software components may be involved in performing the method 600. Method 600 can be executed as a set of computer-executable instructions executed by a computer system and encoded or stored on a computer-readable medium. Hereinafter, the method 600 shall be explained with reference to the systems, components, modules, software, data structures, etc. described in conjunction with FIGS. 1-4. More specifically, method 600 shall be explained as if executed by the agent command and execution module 208. However, method 600 may be executed by hardware, software, and modules previously described. For example, it is to be understood that method 600 may be executed entirely by local agent 204.

Method 600 is initiated at step 604. Method 600 may continuously flow in a loop, flow according to a timed event, or flow according to a change in an operating or status parameter. Once method 600 has started, the agent command and execution module 208 retrieves an agent command, such as command 120, in step 608. Control then passes to step 612, where the agent command and execution module 208 determines whether nor the retrieved command is to be executed according to the time as indicated by computer system 104 or the time as indicated by remote administration system 116 as previously discussed. Alternatively, or in addition, the agent command and execution module 208 may determined that the time indicated by computer system 104 should be modified or updated to match that of the time as indicated by remote administration system 116. In some instances, it may not be necessary to adjust the time on any systems.

Method 600 then moves to step 616 where the agent command and execution module 208 determines the last check-in time. The last check-in time can be determined or retrieved from the location in which the agent command and execution module 208 stored this parameter. Next, the method 600 moves to step 620 where the agent command and execution module 208 determines (i) whether or not the agent command included a check-in expiration time parameter 328, and (ii) whether or not too much time has passed since the last check-in time of the local agent 204. For example, the last check-in time parameter 328 (if include) is compared to the difference between the current time and the last check-in time of the local agent 204. As another example, and as previously described, in instances where local agent 204 has not checked-in with the remote administration system 116, say for three days, but an agent command 120 is scheduled to execute, the check-in expiration time parameter 328 may have been specified having a value of two days. In such an instance, the check-in expiration time parameter 328 value of two days would prevent the agent command 120 from executing; thus, method 600 would proceed to step 648.

Alternatively, or in addition, if it is determined that local agent 204 has not checked-in with the remote administration system 116 at or after a specified time, as indicated by a check-in time expiration parameter 328, then agent command 120 will be cancelled or will expire and the method 600 would proceed to step 648.

If the agent command and execution module 208 determines that the time of the last check-in by local agent 204 is okay or meets or exceeds the required parameter or threshold as specified by the check-in time expiration parameter 328, then method 600 proceeds to step 624 where it is determined whether or not the current time is greater than the scheduled execution time as found in the schedule execution time parameter of agent command 120. If the current time is greater than the scheduled execution time, then method 600 proceeds to step 628 where additional parameters, such as parameters 312 are evaluated.

Method 600 then passes to step 632 where if it is determined that the evaluation additional execution parameters 312, such as EASET 328, dependency 336, override/update 348, and reorder 340, indicate that the agent command 120 is to be executed, method 600 proceeds to step 636 where the agent command and execution module 208 causes the command, such as command 316, to be executed. Once executed, the method then removes the agent command from the agent command list or agent command database, for example 212 (step 640). Once the agent command has been removed, the method ends at step 644. If, in step 632, it is determined that during the evaluation of the additional parameters, the agent command 120 is not to be executed, but instead is to expire, then method 600 passes to step 640 where the agent command is removed the agent command list or agent command database, for example 212. Once the agent command has been removed, the method ends at step 644.

If, at step 632, it is determined that the agent command, such as command 120, should not be executed, method 600 proceeds step 656 where it is determined, based on the evaluation in step 628, whether or not the agent command should be rescheduled or reordered.

If, at step 624, the current time is not greater than the scheduled execution time, then the method proceeds to step 652 where additional execution parameters, for example parameters 312, are evaluated. At step 652, additional parameters, such as dependency 336, override/update 348, and reorder 340 may indicate that the agent command can be reordered in step 656. If the agent command 120 is to be reordered in step 656, then the method proceeds to step 660 where the agent command is reordered/rescheduled. The method then passes to step 644 where the method ends.

If, at step 656, it is determined that the agent command is not to be reordered, then method 600 proceeds to step 644 where the method ends.

Embodiments of the present invention have been described with particular reference to the examples illustrated. However, it will be appreciated that variations and modifications may be made to the examples described within the scope of the present invention. For example, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of evaluating one or more commands to be executed, the method comprising:
   retrieving, by an agent, one or more stored commands, wherein at least one command of the one or more stored commands comprises a check-in expiration time parameter; and determining whether the at least one command of the one or more retrieved commands can be executed by comparing the check-in expiration time parameter and a last check-in time associated with the agent, wherein the check-in expiration parameter indicates whether the at least one command is to execute based upon whether the agent checked-in to the remote administration system.

2. The method according to claim 1, wherein the last check-in time comprises a duration of time that has elapsed since the agent has last contacted a remote system.

3. The method according to claim 2, wherein when the last check-in time is greater than the check-in expiration time parameter, preventing the at least one command from executing.

4. The method according to claim 2, wherein when the last check-in time is less than the check-in expiration time parameter, executing the at least one command.

5. The method according to claim 1, wherein the one or more commands are received from a remote system.

6. The method according to claim 1, wherein the one or more commands are received from a remote system located in a cloud computing environment.

7. The method according to claim 2, wherein the at least one command of the one or more stored commands further comprises a scheduled execution time parameter that defines a scheduled execution time for the at least one command to be executed, and wherein the at least one command is executed when (i) the last check-in time is less than the check-in expiration time and (ii) the scheduled execution time is met.

8. The method according to claim 2, wherein the at least one command further comprises an additional parameter, and wherein the at least one command is executed when (i) the last check-in time is less than the check-in expiration time; (ii) a scheduled execution time is before a current time; and (iii) the additional parameter indicates that the at least one command can be executed.

9. The method according to claim 8, wherein the additional parameter comprises at least one of:
a dependency parameter;
an override/update parameter; and
a reorder parameter.

10. A non-transitory, computer-readable storage medium, encoded with processor readable instructions to perform a method for evaluating one or more commands for execution by an agent, the method comprising:
retrieving, by an agent, one or more stored commands, wherein at least one command of the one or more stored commands comprises a check-in expiration time parameter; and
determining whether the at least one command of the one or more retrieved commands can be executed by comparing the check-in expiration time parameter and a last check-in time associated with the agent, wherein the check-in expiration parameter indicates whether the at least one command is to execute based upon whether the agent checked-in to the remote administration system.

11. The non-transitory, computer-readable storage medium of claim 10, wherein the last check-in time comprises a duration of time that has elapsed since the agent last contacted a remote system.

12. The non-transitory, computer-readable storage medium of claim 11, wherein when the last check-in time is greater than the check-in expiration time parameter, preventing the at least one command from executing.

13. The non-transitory, computer-readable storage medium of claim 11, wherein when the last check-in time is less than the check-in expiration time parameter, executing the at least one command.

14. The non-transitory, computer-readable storage medium of claim 11, wherein the at least one command of the one or more stored commands further comprises a scheduled execution time parameter that defines a scheduled execution time for the at least one command to be executed, and wherein the at least one command is executed when (i) the last check-in time is less than the check-in expiration time and (ii) the scheduled execution time is met.

15. The non-transitory, computer-readable storage medium of claim 11, wherein the at least one command further comprises an additional parameter, and wherein the at least one command is executed when (i) the last check-in time is less than the check-in expiration time; (ii) a scheduled execution time is before a current time; and (iii) the additional parameter indicates that the at least one command can be executed.

16. A system comprising:
at least one processor; and
memory encoding computer executable instructions that, when executed by the at least one processor, perform a method comprising:
retrieving, by an agent, one or more stored commands, wherein at least one command of the one or more stored commands comprises a check-in expiration time parameter; and
determining whether the at least one command of the one or more retrieved commands can be executed by comparing the check-in expiration time parameter and a last check-in time associated with the agent, wherein the check-in expiration parameter indicates whether the at least one command is to execute based upon whether the agent checked-in to the remote administration system.

17. The system according to claim 16, wherein the last check-in time comprises a duration of time that has elapsed since the agent has last contacted a remote system.

18. The system according to claim 17, wherein the at least one command of the one or more stored commands further comprises a scheduled execution time parameter that defines a scheduled execution time for the at least one command to be executed, and wherein the at least one command is executed when (i) the last check-in time is less than the check-in expiration time and (ii) the scheduled execution time is met.

19. The system according to claim 17, wherein the at least one command further comprises an additional parameter, and wherein the at least one command is executed when (i) the last check-in time is less than the check-in expiration time; (ii) a scheduled execution time is before a current time; and (iii) the additional parameter indicates that the at least one command can be executed.

20. The system according to claim 17, wherein the additional parameter comprises at least one of:
a dependency parameter;
an override/update parameter; and
a reorder parameter.

* * * * *